3,591,561
PROCESS OF PRODUCTION OF POLYURETHANE ELASTOMER FROM A MIXTURE OF A LACTONE POLYESTER POLYOL AND A LOW MOLECULAR WEIGHT ALIPHATIC DIOL
Seiji Kazama, Suita, Osaka, and Fumihiro Doura, Osaka, Japan, assignors to Takeda Chemical Industries, Ltd., Osaka, Japan
No Drawing. Filed Aug. 29, 1967, Ser. No. 663,947
Claims priority, application Japan, Aug. 29, 1966, 41/57,100
Int. Cl. C08g 22/10
U.S. Cl. 260—77.5                                          6 Claims

ABSTRACT OF THE DISCLOSURE

Polyurethane elastomer having good physical properties is produced by reacting organic diisocyanate with polyol mixture consisting of lactone polyester polyol and low molecular aliphatic diol, followed by curing the resultant product.

---

This invention relates to a process for the production of polyurethane elastomer by using a lactone polyester polyol and a low molecular aliphatic diol, as polyol component.

It has been known that polyurethane elastomer is produced from organic polyisocyanate and polyether polyol or polyester polyol.

In general, however, the polyurethane elastomer made from polyether polyol shows rather poor tear strength and insufficient oil-resistance, and that made from polyester polyol is degraded in its hydrolytic resistance and low-temperature flexibility, and therefor their application to practical use, especially application under low temperature conditions or application under heavy load for a long period of time, is remarkably limited.

For overcoming these defects, it has been contrived to produce polyurethane elastomer from organic polyisocyanate and lactone polyester polyol in place of the above polyether polyol or polyester polyol.

Thus-produced polyurethane elastomer, however, is slightly improved in its low-temperature properties, but not in its tear strength, and therefore also this elastomer is not satisfactory for practical application.

Thus, it has been a desideratum to provide polyurethane elastomer having improved low-temperature properties and high tear strength as well as other good mechanical properties and chemical and hydrolytic resistance, which is satisfactorily applicable to a wide range and variety of practical uses.

The object of the present invention is to provide polyurethane elastomer having high tear strength and good low-temperature properties as well as other good mechanical properties, and which is applicable to a wide range and variety of practical uses.

Further object of the present inventon is to provide an industrially feasible process for the production of polyurethane elastomer having high tear strength and good low-temperature properties.

These objects are realized according to the present invention, by reacting organic diisocyanate with polyol mixture consisting of a lactone polyester polyol having a molecular weight between about 1700 to about 3000 and of a low molecular aliphatic diol having a molecular weight between about 60 to about 150 and curing thus-produced pre-polymer.

In accordance with the present invention, both the lactone polyester polyol having a molecular weight of about 1700 to about 3000, and the low molecular aliphatic diol having a molecular weight of about 60 to about 150 are employed as polyol component.

The lactone polyester polyol used in this invention is obtained by reacting a lactone with a difunctional initiator by heating the same in the presence or absence of a catalyst, the initiator being exemplified by diols (e.g. ethylene glycol, propylene glycol, diethylene glycol, 1,4-butanediol, xylenediol, etc.), diamines (e.g. ethylenediamine, phenylenedimaine, xylylenediamine, etc.) or amino alcohols (e.g. ethanolamine, p-aminophenethyl alcohol, etc.). The lactone may have 5 to 7 carbon atoms, and is typically exemplified by δ-valerolactone, ε-caprolactone, τ-enantholactone and methyl caprolactone, etc.

The above lactone polyester polyol can be prepared in per se known manner as described in, for example, U.S. Pat. No. 2,890,208, No. 2,977,885 and No. 2,933,478.

Molecular weight of the lactone polyester polyol employed in the present method is desirably about 1700 to about 3000, and more especially 1900 to 2500.

The lactone polyester polyol having the above molecular weight ranges has, more advantageously, an acid number less than 2.0 and a water-content less than 0.1%.

The low molecular aliphatic diol used as the other polyol component in this invention has a molecular weight of about 60 to about 150 and is exemplified by diethylene glycol, 1,2-propylene glycol, 1,3-propylene glycol, 1,3-butanediol, 1,4-butanediol, 1,5-pentanediol, 1,6-hexanediol, 1,4-cyclohexanediol and mixtures thereof.

Among these low molecular aliphatic diols, 1,4-butanediol or diethylene glycol and mixtures thereof give best results.

In the present invention, the lactone polyester polyol and the low molecular aliphatic diol are employed in such an amount that the average molecular weight of the mixture of the lactone polyester polyol and the low molecular aliphatic diol falls within the range of about 800 to about 2000.

Polyether polyol or lactone polyester polyol having not less than three OH groups per molecule can be used together with the present polyol component in such an amount that the total number of OH groups of the polyol is less than 1/10, more desirtbly less than 3/100, relative to the total number of the OH groups of the present polyol component.

Exemplary of the organic diisocyanate employable in the present method are aromatic diisocyanate such as 2,4- or 2,6-tolylene diisocyanate (TDI) or mixtures thereof, diphenylmethane diisocyanate (MDI), dianisidine diisocyanate, biphenylene diisocyanate, 1,5-naphthylene diisocyanate, m- or p-phenylene diisocyanate, o-, m- or p-dimethylbenzene-ω, ω'-diisocyanate or mixtures of two or more thereof, aliphatic diisocyanate such as tetramethylene diisocyanate, hexamethylene diisocyanate, etc.

In the first step of the present invention, the lactone polyester polyol is mixed with low molecular aliphatic diol in such a ratio that the average molecular weight of the whole mixture ranges from about 800 to about 2000, and the thus-prepared polyol mixture is allowed to react with the organic diisocyanate.

The polyol mixture and the organic diisocyanate are subjected to a reaction in such a ratio that the total number of NCO groups in the latter is about 1.2 to about 4 times, more desirably about 1.8 to about 3 times, as much as the total number of OH groups in the former.

The reaction is carried out at about 50° C. to 100° C. for a period of about 20 minutes to 24 hours under substantially anhydrous conditions.

If desired, the reaction may be carried out in an inert gas such as nitrogen gas.

In carrying out the reaction, a catalyst such as tertiary amine (e.g. triethylamine, N,N,N',N'-tetramethyl-1,3-butanediamine, etc.), and/or a gelation inhibitor (e.g. benzoyl chloride, etc.) is or are added to the reaction system.

Precise technique applied for effecting the reaction may be any of the per se known techniques, which are described in, for example, "High polymers, vol. XVI. Polyurethane: Chemistry and Technology I, Chemistry" by Saunders and Frisch (1962), published by Interscience Publishers.

In this way, a pre-polymer is produced as colorless to pale yellow liquid or wax-like solid, the isocyanate content of which is within the range of about 2.5 to about 9.0 wt. percent.

Thus-produced pre-polymer is then cured by reacting with a curing agent or cross-linking agent having not less than two active hydrogen atoms, such as water, polyvalent amine, polyol, amino-alcohol or polyvalent alcohol, at room temperature (about 15° to 30° C.) or heating to 60 to 150° C., whereby polyurethane elastomer is produced.

The polyvalent amines are exemplified by aliphatic diamine (e.g. ethylene diamine, butylene diamine, hexamethylene diamine, hydrazine, etc.), cycloaliphatic diamine (e.g. cyclohexane diamine) and aromatic diamine (e.g. m-phenylenediamine, p-phenylenediamine, naphthylenediamine, benzidine, xylylenediamine, tolylenediamine, methylene-bis(2-chloro aniline), o,o'-dichloro-benzidine, etc.).

The polyols are exemplified by aliphatic polyol (e.g. ethylene glycol, propylene glycol, 1,4-butanediol, 1,6-hexanediol, neopentyl glycol, glycerine, trimethylolpropane, triethanolamine, triisopropanolamine, etc.) cycloaliphatic polyol (e.g. cyclohexane-dimethanol, hydrogenated bisphenol-A), aromatic polyol (e.g. hydroquinone-bis($\beta$-hydroxyethylether), etc.) and polyether polyol or polyester polyol having not less than two active hydrogen atoms, etc.

The amino alcohols are exemplified by ethanolamine, isopropanolamine, p-aminophenethyl alcohol, etc.

The above mentioned curing agents may be used singly or as a mixture of two or more thereof.

From the practical point of view, o,o'-dichlorobenzidine or methylene-bis(2-chloro-aniline) is most advantageously employed in the present method.

The curing agent is employed in such an amount that the ratio of total active hydrogen atoms in the curing agent relative to the total NCO groups in the prepolymer is about 0.7 to 1.0, more desirably about 0.8 to about 0.98 (equivalent ratio).

When desired, cellular polyurethane elastomer can be obtained from the pre-polymer by allowing the curing agent or a cross-linking agent to act upon the pre-polymer in the presence of a blowing agent.

As the blowing agent, there can be employed those per se known, which are exemplified by water, compounds generating water during the reaction, halogenated hydrocarbons having lower boiling point such as dichlorodifluoromethane, trichloromonofluoromethane, etc.

For carrying out the present method, the reaction can be conducted in the presence of, for example, foam stabilizer (e.g. silicone oil-polydimethyl siloxane, alkylsilanepolyoxyalkylene copolymer, non-ionic surface active agents such as sorbitan monostearate, glycerol monooleate), paints, additives, reinforcing materials, dyes, antioxidants, fireproofing agents, etc.

The precise technique for the curing reaction may be any of per se known techniques, described in, for example, the above-mentioned "High Polymers, vol. XVI. Polyurethanes: Chemistry and Technolgoy I, Chemistry."

Thus, polyurethane elastomer having high tear strength and good low-temperature properties is produced without degrading any other physical properties such as hardness, tensile modulus, tensile strength, elongation, abrasion resistance, etc.

For the purpose of a better understanding of this invention, the following non-limitative, i.e. purely illustrative, examples and references are given. In these examples and references, "parts" means parts by weight unless otherwise specified. The abbreviations "kg.," "cm.," and "mg." signify "kilograms," "centimeters" and "milligrams," respectively.

Throughout the examples and references, the mechanical properties of the polyurethane elastomer are measured by the following methods:

Shore hardness: American Society for Testing Materials Procedure (ASTM) D–676–49T.
Tensile modulus: Japanese Industries Standard (JIS) K–6301.
Tensile strength: JIS K–6301.
Elongation: JIS K–6301.
Tear strength: JIS K–6301. B Type.
Low-temperature properties: Torsional modulus of the test piece is measured with the use of ligroin as a coolant by Clash-Berg testing apparatus (JIS K–6745) at 25° C. and at other various temperatures lower than 25° C., and the temperature at which the torsional modulus increases up to about ten times as much as that at 25° C., is determined. Thus-determined temperature is shown as a value of $T_{10}$.
Abrasion resistance: With the use of Tabor abrasion tester, a test piece is abraded 1000 cycles by an H–18 abrasion wheel under 1 kilogram load on the test piece, and the abrasion loss in weight of the piece is measured.

Abrasion resistance is shown as an average value of abrasion loss measured five times by the above procedure.

REFERENCE 1

To 100 parts of poly caprolactone polyester diol (average molecular weight about 986 and acid number 0.2) which is obtained by reacting $\epsilon$-caprolactone with diethylene glycol after the manner disclosed in U.S. Pat. No. 2,890,208, there is added 30.7 parts of a mixture of 80 parts of 2,4-tolylenediisocyanate and 20 parts of 2,6-tolylenediisocyanate (hereinafter referred to as TDI-80), followed by stirring at 75° C. for 2.5 hours in a dry nitrogen gas stream to allow a reaction to take place, whereby polyurethane prepolymer having an NCO content of 4.82 wt. percent is produced.

Fifty parts of thus-produced polyurethane prepolymer heated at 80° C. is homogeneously admixed with 6.8 parts of methylene-bis(20-chloroaniline) which is previously melted by heating at 100° C.

The mixture is then made into a sheet, followed by maintaining at 120° C. for 2 hours, whereby a curing reaction comes to completion.

The mechanical properties of the thus-produced cured sheet are as follows:

Shore hardness—89A
Tensile modulus (300%)—166 kg./cm.$^2$
Tensile strength—631 kg./cm.$^2$
Elongation—400%
Tear strength—65 kg./cm.
Rebound resilience—34%
$T_{10}$——15° C.
Abrasion resistance—50 mg.

REFERENCE 2

By the same procedure as in Reference 1 except that 100 parts of polyoxypropylene glycol (average molecular weight 1,000) is used in place of caprolactone polyester diol, a cured sheet having the following mechanical properties is obtained.

Shore hardness—90A
Tensile modulus (300%)—140 kg./cm.$^2$
Tensile strength—329 kg./cm.$^2$
Elongation—440%
Tear strength—46 kg./cm.
Rebound resilience—24%
$T_{10}$——7° C.
Abrasion resistance—250 mg.

REFERENCE 3

By the same procedures as in Reference 1 except that 100 parts of polyethylene adipate (average molecular weight 1,000 and acid number 0.4) which is obtained by reacting ethylene glycol with adipic acid is used in place of caprolactone polyester diol, a cured sheet having the following mechanical properties is obtained:

Shore hardness—92A
Tensile modulus (300%)—192 kg./cm.$^2$
Tensile strength—573 kg./cm.$^2$
Elongation—380%
Tear strength—75 kg./cm.
Rebound resilience—28%
$T_{10}$— −10° C.
Abrasion resistance—130 mg.

Example 1

One hundred parts of poly caprolactone polyester diol (average molecular weight about 1986 and acid number 0.5) which is obtained by reacting ε-caprolactone with diethylene glycol after the manner disclosed in U.S. Pat. No. 2,890,208 is admixed with 5.3 parts of diethylene glycol. The mixture has an average molecular weight of about 1000. To the mixture is added 31.2 parts of TDI-80, followed by stirring at 75° C. for 2.5 hours in dry nitrogen gas stream to allow a reaction to take place, whereby polyurethane prepolymer showing an NCO content of 4.75 wt. percent is produced.

Fifty parts of thus-produced polyurethane prepolymer heated at 80° C. is homogeneously admixed with 6.8 parts of methylene-bis(2-chloroaniline) which is previously melted by heating at 100° C.

The mixture is then made into a sheet, followed by maintaining at 120° C. for 2 hours, whereby curing reaction comes to completion.

The mechanical properties of thus-produced cured sheet are as follows:

Shore hardness—90A
Tensile modulus (300%)—204 kg./cm.$^2$
Tensile strength—743 kg./cm.$^2$
Elongation—450%
Tear strength—81 kg./cm.$^2$
Rebound resilience—44%
$T_{10}$— −30° C.
Abrasion resistance—51 mg.

Example 2

One hundred parts of poly caprolactone polyester diol (average molecular weight about 1986 and acid number 0.5) which is obtained by reacting ε-caprolactone with diethylene glycol after the manner disclosed in U.S. Pat. No. 2,890,208 is admixed with 4.5 parts of 1,4-butanediol. The mixture has an average molecular weight of about 1000. To the mixture is added 31.1 parts of TDI-80 followed by stirring at 70° C. for 2 hours in dry nitrogen gas stream to allow a reaction to take place, whereby polyurethane prepolymer showing an NCO content of 4.77 wt. percent is produced.

Fifty parts of thus-produced polyurethane prepolymer heated at 80° C. is homogeneously admixed with 6.8 parts of methylene-bis(2-chloroaniline) which is previously melted by heating at 100° C.

The mixture is then treated in a similar manner as in Example 1 to give cured sheet having the following mechanical properties:

Shore hardness—91A
Tensile modulus (300%)—194 kg./cm.$^2$
Tensile strength—723 kg./cm.$^2$
Elongation—460%
Tear strength—85 kg./cm.
Rebound resilience—45%
$T_{10}$— −31° C.
Abrasion resistance—47 mg.

Example 3

One hundred parts of poly caprolactone polyester diol (average molecular weight of about 2716 and acid number 0.3) which is obtained by reacting ε-caprolacetone with 1,4-butanediol after the manner disclosed in U.S. Pat. No. 2,890,208 is admixed with 6.3 parts of 1,4-butanediol. The mixture has an average molecular weight of about 1000. To the mixture is added 32.4 parts of TDI-80, followed by stirring at 80° C. for 1.5 hours to allow a reaction to take place, whereby polyurethane prepolymer showing an NCO content of 4.87 wt. percent is produced.

Fifty parts of thus-produced polyurethane prepolymer heated at 80° C. is homogeneously admixed with 6.8 parts of methylene-bis(2-chloroaniline) which is previously melted by heating at 100° C.

The mixture is then treated in a similar manner as in Example 1 to give cured sheet having the following mechanical properties:

Shore hardness—92A
Tensile modulus (300%)—226 kg./cm.$^2$
Tensile strength—712 kg./cm.$^2$
Elongation—440%
Tear strength—83.4 kg./cm.
Rebound resilience—49%
$T_{10}$— −35° C.
Abrasion resistance—53 mg.

Example 4

One hundred parts of poly caprolactone polyester diol (average molecular weight about 2716 and acid number 0.2) which is obtained by reacting ε-caprolactone with diethylene glycol after the manner disclosed in U.S. Pat. No. 2,890,208 is admixed with 1.2 parts of 1,4-butanediol. The mixture has an average molecular weight of about 2000. To the mixture is added 17.6 parts of TDI-80, followed by stirring at 75° C. for 3 hours in a dry nitrogen gas stream, whereby polyurethane prepolymer showing an NCO content of 3.61 wt. percent is produced.

One hundred parts of thus-produced polyurethane prepolymer heated at 80° C. is homogeneously admixed with 10.3 parts of methylene-bis(2-chloroaniline) which is previously melted by heating at 100° C.

The mixture is then made into a sheet, followed by maintaining at 120° C. for 2 hours, whereby curing reaction comes to completion.

The mechanical properties of thus-produced cured sheet are as follows:

Shore hardness—82A
Tensile modulus (300%)—109 kg./cm.$^2$
Tensile strength—620 kg./cm.$^2$
Elongation—530%
Tear strength—72 kg./cm.
Rebound resilience—65%
$T_{10}$— −38° C.
Abrasion resistance—32 mg.

Example 5

One hundred parts of the same poly caprolactone polyester diol as in Example 1 is admixed with 5.3 parts of diethylene glycol. The mixture has an average molecular weight of about 1000. To the mixture is added 33.6 parts of dimethyl benzene-ω,ω'-diisocyanate (a mixture of 72 weight percent of m-isomer and 28 weight percent of p-isomer), followed by stirring at 75° C. for 3 hours to allow a reaction to take place, whereby polyurethane prepolymer showing an NCO content of 4.66 wt. percent is produced.

One hundred parts of thus-produced polyurethane prepolymer is homogeneously admixed with 13.3 parts of methylene-bis(2-chloroaniline) in the same manner as in Example 1.

The mixture is then treated in a similar manner as in Example 1 to give cured sheet having the following mechanical properties:

Shore hardness—80A
Tensile modulus (300%)—103 kg./cm.$^2$
Tensile strength—600 kg./cm.$^2$
Elongation—470%
Tear strength—61 kg./cm.
Rebound resilience—58%
$T_{10}$——32° C.
Abrasion resistance—40 mg.

On the other hand, to 100 parts of poly caprolactone polyester diol (average molecular weight about 1039) which is obtained by reacting ε-caprolactone with diethylene glycol after the manner disclosed in U.S. Pat. No. 2,890,208 is added 32.9 parts of dimethyl benzene-$\omega,\omega'$-diisocyanate (a mixture of 72 weight percent of m-isomer and 28 weight percent of p-isomer) to obtain polyurethane prepolymer showing an NCO content of 4.66 wt. percent.

Thus-produced polyurethane prepolymer is then treated in a similar manner as in Example 5 to give cured sheet having the following mechanical properties:

Shore hardness—80A
Tensile modulus (300%)—86.2 kg./cm.$^2$
Tensile strength—376 kg./cm.$^2$
Elongation—470%
Tear strength—48 kg./cm.
Rebound resilience—51%
$T_{10}$——22° C.
Abrasion resistance—43 mg.

EXAMPLE 6

One hundred parts of poly valerolactone polyester diol (average molecular weight about 2020 and acid number 0.5) which is obtained by reacting δ-valerolactone with diethlylene glycol after the manner disclosed in U.S. Pat. No. 2,890,208 is admixed with 4.5 parts of 1,4-butanediol. The mixture has an average molecular weight of about 1000. To the mixture is added 31.1 parts of TDI-80, followed by stirring at 75° C. for 3 hours in a dry nitrogen gas stream to allow a reaction to take place, whereby polyurethane prepolymer showing an NCO content of 4.72 wt. percent is produced.

Fifty parts of thus-produced polyurethane prepolymer heated at 80° C. is homogeneously admixed with 6.8 parts of methylene-bis(2-chloroaniline) which is previously melted by heating at 100° C. Cured sheet obtained from the mixture after a similar manner as in Example 1 has the following mechanical properties:

Shore hardness—92A
Tensile modulus (300%)—240 kg./cm.$^2$
Tensile strength—620 kg./cm.$^2$
Elongation—430%
Tear strength—90 kg./cm.
Rebound resilience—40%
$T_{10}$——27° C.

EXAMPLE 7

One hundred parts of polyurethane prepolymer produced by Example 2, which shows an NCO content of 4.7 wt. percent is heated at 80° C.

A mixture of 9.0 parts of methylene-bis(2-chloroaniline), 0.4 part of water, 0.2 part of triethylenediamine and 1.9 parts of silicone oil surfactant is heated at 80° C. Thus-heated mixture is homogeneously admixed under agitation with the heated prepolymer prepared as above, whereby cellular elastomer having the following mechanical properties is obtained:

Density—0.38 g./cm.$^3$
Tensile strength—29 kg./cm.$^2$
Elongation—430%
Rebound resilience—47%
Tear strength—14 kg./cm.
$T_{10}$——32° C.

On the other hand, in place of the prepolymer used in Example 7, 100 parts of the same polyurethane prepolymer as in Reference 1 is heated and treated by the same manner as Example 7.

Thus obtained cellular elastomer has the following mechanical properties:

Density—0.42 g./cm.$^3$
Tensile strength—26 kg./cm.$^2$
Elongation—420%
Rebound resilience—34%
Tear strength—11 kg./cm.
$T_{10}$——15° C.

The fact that the mechanical properties of elastomer produced according to the present invention are not degraded even at rather low temperature renders such elastomer effectively applicable to all-season uses. Thus, the elastomers of the invention are useful in the automotive and allied fields in the manufacture of timing belts, tires for trucks and the like, solid tires, mounts, flexible joint covers, gear covers, bushings, friction rollers, etc.

What is claimed is:

1. A polyurethane elastomer produced by reacting a polyol and an organic diisocyanate, followed by curing the resultant product with a curing agent having not less than two active hydrogen atoms, the improvement according to which, the polyol is a mixture consisting of (1) a lactone polyester polyol having a molecular weight between about 1700 and about 3000 and (2) a low molecular aliphatic diol having a molecular weight between about 60 to about 150, said mixture having an average molecular weight of about 800 to about 2000, and the ratio of the total number of NCO groups to be reacted with the polyols to the total number of hydroxy groups of the polyols ranges from about 1.2 to about 4.0.

2. The elastomer according to claim 1, wherein the lactone polyester polyol is poly ε-caprolactone polyester polyol.

3. The elastomer according to claim 1, wherein the low molecular aliphatic diol is 1,4-butanediol.

4. The elastomer according to claim 1, wherein the low molecular aliphatic diol is diethylene glycol.

5. The elastomer according to claim 1, wherein the average molecular weight of the mixture of lactone polyester polyol and low molecular aliphatic diol is 800 to 1500.

6. The elastomer according to claim 1, wherein the ratio of the total number of diisocyanate groups to the total number of hydroxy groups of the polyols is 1.8 to 3.0.

References Cited

UNITED STATES PATENTS

| | | | |
|---|---|---|---|
| 2,929,800 | 3/1960 | Hill | 260—77.5 |
| 2,933,477 | 4/1960 | Hostettler | 260—77.5 |

OTHER REFERENCES

Magnus, Rubber Age, vol. 97, No. 42, July 1965, pp. 86–93.

Saunders et al., Polyurethanes, Part II, Interscience, New York, 1964, pp. 337, 338 and 339.

HOSEA E. TAYLOR, Primary Examiner

M. J. WELSH, Assistant Examiner

U.S. Cl. X.R.

260—2.5